United States Patent [19]
Reimers et al.

[11] Patent Number: 6,074,777
[45] Date of Patent: Jun. 13, 2000

[54] ADDITIVES FOR OVERCHARGE PROTECTION IN NON-AQUEOUS RECHARGEABLE LITHIUM BATTERIES

[75] Inventors: Jan Naess Reimers, Maple Ridge; Brian Michael Way, Coquitlam, both of Canada

[73] Assignee: E-One Moli Energy (Canada) Limited, Maple Ridge, Canada

[21] Appl. No.: 09/030,252

[22] Filed: Feb. 25, 1998

[30] Foreign Application Priority Data

Sep. 26, 1997 [CA] Canada ................................ 2216898

[51] Int. Cl.⁷ ........................... H01M 10/40; H01M 2/34
[52] U.S. Cl. .................. 429/61; 429/62; 429/200; 429/324; 429/331; 429/332; 429/338
[58] Field of Search ........................... 429/200, 324, 429/326, 339, 61, 62, 331, 332, 338

[56] References Cited

U.S. PATENT DOCUMENTS

| | | | |
|---|---|---|---|
| 4,075,400 | 2/1978 | Fritts | 429/62 |
| 4,104,451 | 8/1978 | Klemann et al. | 429/339 X |
| 5,709,968 | 1/1998 | Shimizu | 429/324 |

FOREIGN PATENT DOCUMENTS

| | | |
|---|---|---|
| 2099657 | 6/1993 | Canada . |
| 2156800 | 8/1995 | Canada . |
| 2163187 | 11/1995 | Canada . |
| 2205683 | 5/1997 | Canada . |
| 0746050 | 12/1996 | European Pat. Off. . |
| 7-302614 | 11/1995 | Japan . |

OTHER PUBLICATIONS

J.R. Dahn et al.; "Thermal Stability of LixCoO2, LixNiO2, and λ–MnO2 and consequences for the safety of Li–ion cells"; Solid State Ionics 69 (1994); pp. 265–270 (Month Unknown).

*Primary Examiner*—Stephen Kalafut
*Attorney, Agent, or Firm*—Synnestvedt & Lechner LLP

[57] ABSTRACT

Non-aqueous rechargeable lithium batteries can be protected against overcharge abuse by incorporating small amounts of suitable additives into the electrolyte. Additives selected from the group consisting of phenyl-R-phenyl compounds wherein R is an aliphatic hydrocarbon, fluorine substituted biphenyl compounds, and 3-thiopheneacetonitrile can provide superior cycling performance along with satisfactory overcharge protection in high voltage lithium ion batteries. 2,2-diphenylpropane can be a preferred gassing agent additive in batteries equipped with electrical disconnect devices.

26 Claims, 2 Drawing Sheets

ADDITIVES FOR OVERCHARGE PROTECTION IN NON-AQUEOUS RECHARGEABLE LITHIUM BATTERIES

FIELD OF THE INVENTION

This invention pertains to non-aqueous rechargeable lithium batteries and to methods for improving the safety thereof. Specifically, it pertains to the use of certain improved additives as means for providing overcharge protection in lithium ion batteries.

BACKGROUND OF THE INVENTION

The demand for rechargeable batteries having ever greater energy density has resulted in substantial research and development activity in rechargeable lithium batteries. The use of lithium is associated with high energy density, high battery voltage, long shelf life, but also with safety problems (eg. fires). As a result of these safety problems, many rechargeable lithium battery electrochemistries and/or sizes are unsuitable for use by the public. In general, batteries with electrochemistries employing pure lithium metal or lithium alloy anodes are only available to the public in very small sizes (eg. coin cell size) or are primary types (eg. non-rechargeable). However, larger rechargeable batteries having such electrochemistries can serve for military or certain remote power applications where safety concerns are of somewhat lesser importance.

Recently, a type of rechargeable lithium battery known as lithium-ion or 'rocking chair' has become available commercially and represents a preferred rechargeable power source for many consumer electronics applications. These batteries have the greatest energy density (Wh/L) of presently available conventional rechargeable systems (ie. NiCd, NiMH, or lead acid batteries). Additionally, the operating voltage of lithium ion batteries is often sufficiently high such that a single cell can suffice for many electronics applications.

Lithium ion batteries use two different lithium insertion compounds for the active cathode and anode materials. The excellent reversibility of this lithium insertion makes such compounds function extremely well in rechargeable battery applications wherein thousands of battery cycles can be obtained. 3.6 V (average) lithium ion batteries based on varied $LiCoO_2$/carbon electrochemistries are now commercially available. A wide range of carbonaceous compounds is suitable for use as the anode material, including coke and pure graphite. Also, many other lithium transition metal oxide compounds are suitable for use as the cathode material, including $LiNiO_2$ and $LiMn_2O_4$. The aforementioned products employ non-aqueous electrolytes comprising $LiBF_4$ or $LiPF_6$ salts and solvent mixtures of ethylene carbonate, propylene carbonate, diethyl carbonate, ethyl methyl carbonate, and the like. Again, numerous options for the choice of salts and/or solvents in such batteries are known to exist in the art.

Lithium ion batteries can be sensitive to certain types of abuse, particularly overcharge abuse wherein the normal operating voltage is exceeded during recharge. During overcharge, excessive lithium is extracted from the cathode and a corresponding excessive insertion or even plating of lithium occurs at the anode. This can make both electrodes less stable thermally. The anode becomes less stable as it gets doped or plated with reactive lithium while the cathode becomes more prone to decomposing and evolving oxygen (see J. R. Dahn et al., Solid State Ionics, 69(3-4), p265–270, 1994). Overcharging also results in heating of the battery since much of the input energy is dissipated rather than stored. The decrease in thermal stability combined with battery heating can lead to thermal runaway and fire on overcharge.

Battery chargers and/or battery packs comprising assemblies of individual lithium ion batteries are generally equipped with appropriate electrical circuitry to prevent overcharge from happening. However, in the event of a failure or a deliberate defeating of the circuitry, many manufacturers have decided to incorporate additional safety devices, in the individual batteries themselves, as a greater level of protection against overcharge abuse. For instance, as described in U.S. Pat. No. 4,943,497 and Canadian Patent Application Serial No.2,099,657 respectively, some of the present products of Sony and Moli Energy (1990) incorporate internal disconnect devices which activate when the internal pressure of the battery exceeds a predetermined value during overcharge abuse. Various gassing agents (eg. cathode compounds and/or other battery additives) may be used to generate sufficient gas above a given voltage during overcharge so as to activate the disconnect device. Another approach has been to incorporate overcharge safety devices in the batteries themselves which limit the charging current and/or voltage. For instance, positive temperature coefficient resistors (PTCs) are incorporated by some manufacturers in part to limit the charging current during overcharge abuse. These devices rely on the combination of heating of the battery and IR heating of the PTC to activate the PTC, thereby increasing its resistance and limiting the charging current.

Other means for limiting charging current in the batteries themselves is disclosed in co-pending Canadian Patent Application Serial No. 2,156,800, filed Aug. 23, '1995, by a common applicant. Therein, a small amount of a suitable polymerizable monomer additive is mixed in the liquid electrolyte for purposes of protecting a rechargeable lithium battery during overcharge. The additive polymerizes at voltages greater than the maximum operating voltage of the battery (ie. during overcharge abuse), thereby forming a blocking polymeric film and resulting in an increase in the internal resistance of the battery. As with PTC devices, this increase can limit the charging current sufficiently for protection. Several suitable monomer additives were identified for use in common lithium ion battery electrochemistries. A preferred additive was biphenyl which was shown to provide satisfactory overcharge protection without adversely affecting cycle life of certain battery embodiments tested at 21° C. up to normal maximum operating voltages of 4.2 V.

Later, as disclosed in co-pending Canadian Patent Application Serial No. 2,163,187, filed Nov. 17, '1995, by a common applicant, it was discovered that similar polymerizable monomer additives could also be used as gassing agents in batteries for purposes of activating internal electrical disconnect devices on overcharge. Again, a preferred additive was biphenyl which was shown to generate a satisfactory amount of disconnect activating gas during overcharge of certain lithium ion battery embodiments.

Later still, as disclosed in co-pending Canadian Patent Application Serial No. 2,205,683, filed May 16, '1997, by a common applicant, it was discovered that certain additives could be used to make overcharged batteries safe by 'automatically' discharging them to a safe state of charge. This was accomplished by choosing an additive which polymerized to form a conductive polymer during overcharge. As in the above Canadian Patent Application Serial No. 2,156,800, such an additive can initially form an ionically blocking film when it polymerizes and thus increase the internal resistance of the battery. However, when sufficient polymer has been generated to bridge the gap between cathode and anode electrodes, the electrically conductive polymer can then create a mild internal short in the battery thereby effecting a slow, safe self-discharge. This invention was particularly useful for batteries comprising activated internal electrical disconnect devices which can no longer be externally discharged to drain them of energy and put them into a more thermally stable state of charge. Again, a preferred additive for this purpose was biphenyl.

In the art, it is common to protect against certain abuse situations via use of a suitable separator that melts or shuts down at a specific temperature (the shutdown temperature). For instance, in European Patent Application No. 746050, Sony employs certain polymerizable electrolyte additives that apparently generate sufficient heat when polymerized during overcharge abuse that the separator melts and shuts down well before an unsafe state of charge is reached. The melting of the separator increases the internal resistance of the battery markedly and protects it against further overcharge. Microporous polyolefin separators are generally considered suitable for this purpose. In particular, microporous polypropylene and polyethylene separators, having shutdown temperatures of about 155° C. and 125° C. respectively, are commonly employed in lithium batteries. The embodiments described in the actual examples of the Sony disclosure employed polyethylene separators. The enabling electrolyte additives disclosed were limited to a variety of aromatic compounds all of which had structures consisting of single benzene rings with alkyl, alkoxy, and/or halogen groups substituted for hydrogen.

It has also been suggested in the art that certain redox or chemical shuttle additives can be employed in non-aqueous rechargeable lithium batteries for purposes of protecting against overcharge abuse. This mechanism is intended to be similar to the oxygen recombination reaction which can harmlessly consume overcharge current in aqueous batteries. In Japanese published patent application 07-302614, Sony proposes the use of various redox shuttle additives for lithium batteries. Thus, for the most part in this invention, the additives have to be capable of undergoing reversible oxidation/reduction cycles and so the oxidation and the reduction species of the additive must both be chemically stable. The enabling additives disclosed were limited to a variety of aromatic compounds having either a single ring, a multi-ring with common or shared bond, or a dimethoxy-biphenyl base structure.

In the aforementioned prior art items pertaining to biphenyl additives, it was shown that use of a small amount of biphenyl did not seriously affect battery performance under normal single cell test conditions. However, the individual cells in battery packs comprising more than one cell in series often are subjected to voltages that slightly exceed the usual maximum operating charging voltage of a single cell (eg. by 0.1 V). At slightly higher voltages and/or temperatures, the additives can be expected to polymerize somewhat more and thus can be expected to affect battery performance more. Thus, while the aforementioned biphenyl and other additives may provide a satisfactory level of performance for some applications, additives which are somewhat more resistant to polymerization while still providing overcharge protection may be preferred in other applications where higher temperatures or voltages might be expected.

SUMMARY OF THE INVENTION

In the three co-pending Canadian patent applications supra (serial nos. 2,156,800, 2,163,187, and 2,205,683), it was disclosed that small amounts of polymerizable compounds can be used as electrolyte additives in certain non-aqueous rechargeable lithium batteries in order to provide protection either during or after overcharge abuse. We have since discovered that additives selected from the group consisting of phenyl-R-phenyl compounds wherein R is an aliphatic hydrocarbon, fluorine substituted biphenyl compounds, and 3-thiopheneacetonitrile can provide for better cycling performance in these batteries while still providing some of the advantages of these earlier inventions. The instant invention therefore represents an improvement to the methods and battery embodiments of these earlier inventions. In batteries which additionally comprise an internal electrical disconnect device, the additive can serve as a desirable gassing agent and be used to generate gas as it reacts, thereby pressure activating the disconnect device and protecting the battery during overcharge abuse. Alternately, the additives might be used to increase the internal resistance of the battery during overcharge in order to reduce the charging current during overcharge abuse, or to create an internal short circuit in the battery during overcharge abuse and subsequently discharge the battery to a safe state of charge thereafter.

Suitable specific additives of the invention include diphenylmethalle, 1,2-diphenyletlhane, 2,2-diphenylpropane, 2-fluorobiphenyl, 2,2'-difluorobiphenyl, and 3-thiopheneaceton itrile. 2,2-diphenylpropane can be a particularly preferred additive with regards to cycling performance.

Generally, these non-aqueous rechargeable lithium batteries comprise a lithium insertion compound cathode, a lithium or lithium compound anode (eg. lithium metal, lithium alloy, or lithium insertion compound), a separator, and a non-aqueous electrolyte. Batteries of the invention comprise a small amount of additive which is mixed in the electrolyte at some suitable stage of assembly. Since a small amount of additive can be sufficient for the above purposes, bulk electrolytes having other desirable properties can be employed. In the instant invention, amounts of about 2.5% improved additive by weight in the electrolyte/improved additive mixture can be sufficient.

Batteries of the invention include lithium ion type batteries which typically have maximum operating charging voltages greater than 4 volts (eg. 4.2 V). The improved additives are specifically useful for batteries which reach voltages above 4.2 V, especially 4.3 volts or greater. Such high voltages might be reached because that is the nominal maximum operating charging voltage or because there is error in the charger control circuitry or because individual cells in the battery reach this voltage in practice (eg. as in the case for individual cells in a typical lithium ion battery pack comprising two or more batteries in series). The improved additives are also specifically useful for batteries whose operating temperature can exceed 40° C., as is the case in many lithium ion battery applications.

The lithium insertion compound cathode can be $Li_xMn_2O_4$, $Li_xCoO_2$, $Li_xNiO_2$ or derivatives and/or combinations thereof. Certain of the aforementioned additives can be particularly effective in $Li_xMn_2O_4$ based batteries. The lithium compound anode can be a carbonaceous insertion compound, particularly graphite. The liquid electrolyte solvent can comprise an organic carbonate or mixtures thereof, including propylene carbonate, ethylene carbonate, and ethyl methyl carbonate. The liquid electrolyte solute can comprise $LiPF_6$.

Batteries of the invention typically employ microporous separators made of a polyolefin which can fuse shut at its melting point, thereby increasing the internal resistance of the battery and assisting in protecting the battery against various forms of abuse. Polyethylene can be a preferred separator material since it has a relatively low melting point of about 125° C. While such a feature may be additionally desirable, it is not essential to the instant invention. Thus, separators might be employed which do not fuse shut below about 125° C.

DETAILED DESCRIPTION OF SPECIFIC EMBODIMENTS OF THE INVENTION

Figure 1:
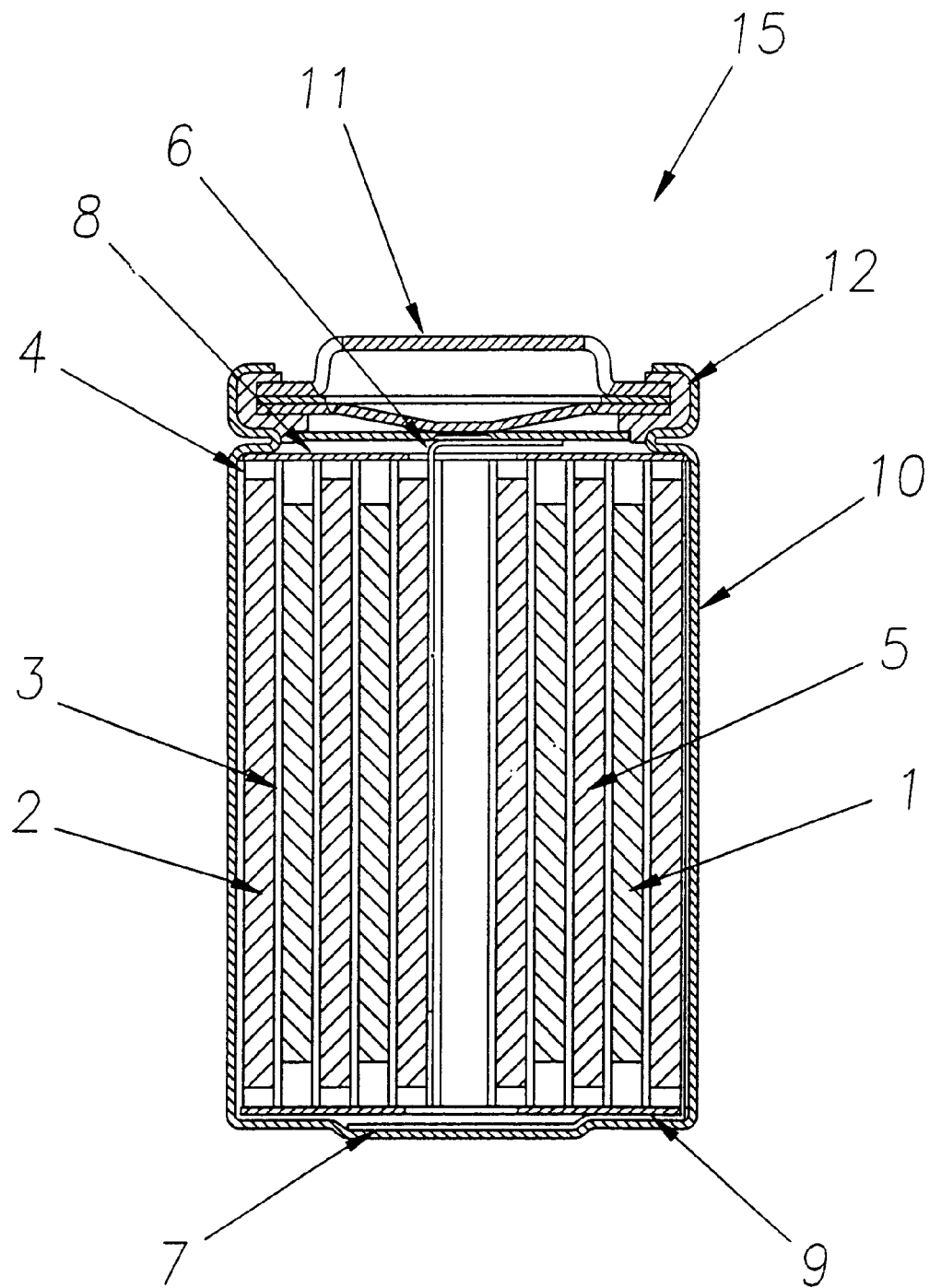
FIG. 1 depicts a cross-sectional view of a preferred embodiment of a cylindrical spiral-wound lithium ion battery.

In the prior art, certain polymerizable compounds have been shown to be useful electrolyte additives in non-aqueous rechargeable batteries for various safety related reasons. While many enabling additives were identified, generally the presence of such an additive results in a penalty with regards to cycling performance (ie. an increased capacity loss is experienced over repeated discharge/recharge cycles). For instance, as shown in the aforementioned Canadian Patent Application Serial No. 2,156,800, the use of furan and 3-chlorothiophene additives in some lithium ion batteries provided desirable safety results but with a small performance penalty. Nonetheless, this penalty can be relatively insignificant in other embodiments over various application regimes. For instance, as shown in the aforementioned Canadian Patent Application Serial No. 2,163,187, a 5% biphenyl additive in a $LiCoO_2$ based lithium ion battery still allowed for excellent cycling results at 21° C. up to a maximum upper voltage limit of 4.1 V cell, even after 1 week of previous storage at 60° C.

However, the same biphenyl containing batteries might be recharged to greater upper voltage limits when used in battery packs comprising more than one individual battery in series since there is always some variation in capacity and balance between individual batteries in the pack. Also, many $LiCoO_2$ and $LiMn_2O_4$ based lithium ion batteries are routinely cycled to upper voltage limits exceeding 4.1 V. Furthermore, batteries like these are often exposed to prolonged high temperature conditions (eg. continuous use at more than 40° C.). Such higher voltage and/or higher temperature conditions can aggravate the detrimental effect of the additive on battery performance. For instance, a small performance penalty can be observed when employing a biphenyl additive under such conditions.

Thus, depending on circumstances of use, it can be desirable to employ additives other than biphenyl which provide acceptable safety benefits coupled with improved cycling performance under higher voltage and/or higher temperature conditions. Some trade-off with regards to safety related matters may be acceptable in order to obtain a desired performance level. In this regard, we have found that the compounds including phenyl-R-phenyl wherein R is an aliphatic hydrocarbon, fluorine substituted biphenyls, and 3-thiopheneacetoniitrile can serve as improved electrolyte additives. Specific suitable compounds include diphenivlmetlhane, 1,2-dipheniylethanie, 2,2-diphenylpropane, 2-fluorobiphenyl, and 2,2'-difluorobiphenyl, along with 3-thiopheneacetonitrile. 2,2-diphenylpropane can be a particularly preferred additive.

The additives of the invention serve as useful gassing agents in high voltage rechargeable lithium batteries and additionally provide for improved cycling performance and acceptable safety behaviour. In batteries equipped with a pressure activated electrical disconnect device, the additive reacts during overcharge and generates gas, which in turn is advantageously used to activate the disconnect device in time to prevent thermal runaway of the battery (see the aforementioned Canadian Patent Application Serial No. 2,163,187).

In situations where the additive undergoes a polymerization reaction, the resultant formed polymer can also be applied so as to provide improved battery safety. For instance, a polymerized additive can protect a battery during overcharge abuse by increasing the internal resistance of the battery thereby reducing or limiting the charging current to a safe level (see the aforementioned Canadian Patent Application Serial No. 2,156,800). Alternately, an additive which polymerizes to form an electrically conductive polymer can be used to create a mild internal short in a battery after overcharge abuse has occurred. Such a mild short results in an automatic low rate discharge of the battery to a more thermally stable, safe state of charge (see the aforementioned Canadian Patent Application Serial No. 2,205,683).

As mentioned in the above prior art, the literature provides information on the polymerization potential and other related characteristics of many polymerizable compounds, but typically using platinum or other electrodes far removed from those employed in lithium rechargeable batteries. However, the polymerization potentials depend to some extent on the electrodes and other electrolyte components employed in the electrochemical system and so polymerization may proceed differently in the actual battery environment. Thus, the literature can only serve to suggest a list of potential candidates for the instant application. Additionally, the effect of any new additive component on the cycling performance of a lithium rechargeable battery cannot generally be predicted in advance. Accordingly, it is not possible to predict in advance which additives would provide improved cycling results in combination with acceptable safety benefits.

Additives of the invention have been empirically determined to provide such improvement in typical lithium rechargeable batteries. These additives can meet the basic requirements of reacting at voltages above the typical maximum operating charging voltage of such batteries but below the overcharge voltage at which such batteries are hazardous. Reaction of such additives can, for example, result in the adequate production of gas to activate a disconnect device. Yet, the additives are relatively inert enough such that battery performance is improved over that obtained with a biphenyl additive.

Nonetheless, some non-inventive empirical trials are required in order to determine which additive and what amount gives the optimum performance for any given battery application. These trials would be expected to include cycle life testing and overcharge testing of trial batteries comprising varied amounts of candidate additives. Such trials should be well within the scope of those skilled in the art.

Generally, the lowest amount of additive is employed to effect the desired safety and/or cycling benefit. Typically, amounts of the order of a few percent by weight or volume in the electrolyte is sufficient. The actual amount required for enablement will again depend in part on battery electrochemistry and design as well as on the additive characteristics.

With the exception of the presence of the additive, the construction of batteries of the invention is conventional. Generally, an enabling amount of additive is simply mixed in with the bulk electrolyte at some preferred point during normal assembly. Minor handling changes may of course be required to account for differences in the properties of the bulk electrolyte plus additive (eg. vapor pressure, toxicity, etc.).

Non-aqueous rechargeable lithium batteries appear in various configurations commercially (ie. prismatic formats or miniature coin cells) and many different components may be used. The additives of the invention provide overcharge protection in several lithium ion battery embodiments and thus it is expected that the same compounds can serve to provide similar overcharge protection in other lithium battery systems.

A preferred construction for a lithium ion type product is depicted in the cross-sectional view of a conventional spiral-wound battery in FIG. 1. A jelly roll 4 is created by spirally winding a cathode foil 1, an anode foil 2, and two microporous polyolefin sheets 3 that act as separators.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include an internal electrical disconnect device (FIG. 1 shows a device similar to that shown in the aforementioned Canadian Patent Application Serial No. 2,099,657) and additional safety devices if desired. Usually, a safety vent is incorporated that ruptures if excessive pressure builds up in the battery. Also, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4. In batteries of the invention, the electrolyte 5 additionally comprises an enabling amount of improved additive.

Without being bound by theory, it is believed that the instant additives polymerize during overcharge in much the same manner as the additives in the aforementioned Canadian patent applications. Thus, there is an expectation that the instant additives may provide similar safety advantages to those disclosed therein.

The following Examples are provided to illustrate certain aspects of the invention but should not be construed as limiting in any way. 18650 size (18 mm diameter, 650 mm height) cylindrical batteries were fabricated as described in the preceding and shown generally in FIG. 1. Cathodes 1 comprised a mixture of $LiMn_2O_4$ powder, a carbonaceous conductive dilutant, and polyvinylidene fluoride (PVDF) binder uniformly coated on both sides of a thin aluminum foil. Anodes 2 were made using a mixture of a spherical graphitic powder plus Super S (trademark of Ensagri) carbon black and polyvinylidene fluoride (PVDF) binder uniformly coated on thin copper foil. Tonen Setela (trademark) microporous polyethylene film was used for the separators 3. The electrolyte 5 was a solution of 1M $LiPF_6$ salt dissolved in a solvent mixture of propylene carbonate (PC), ethylene carbonate (EC) and ethyl methyl carbonate (EMC) in a PC/EC/EMC volume ratio of 10/30/60. Approximately 4 cc of electrolyte was used in each battery. In all cases, the batteries were equipped with a pressure relief vent and internal electrical disconnect devices as described in the aforementioned Canadian Patent Application Serial No. 2,099,657.

For electrical testing, batteries were initially thermostatted at 21±1° C. All batteries were then conditioned by charging, discharging, and then charging again to the normal maximum operating voltage of 4.2 volts. Where indicated, further cycling was performed outside the normal operating range using a current limited, constant voltage charge (1.2 A maximum, to 4.3 volts) and constant 1.2 amp current discharge to a 2.5 volt cutoff at an elevated 40° C. Every 20 cycles, a series of discharge currents with decreasing magnitude (eg. 1.2A, 0.6A, 0.3A, 0.15A, 0.125A, 0.062A, 0.031 A) was applied in a stepwise fashion for purposes of determining if any observed capacity loss was recovered at a lower discharge rate, ie. a loss in delivered capacity resulting from an impedance buildup. For a similar purpose, but starting at a different cycle number, after every 20 cycles, a series of constant current recharges with decreasing magnitude were performed to a constant voltage limit in the same stepwise fashion. However, performing either of these constant current series can introduce a noticeable discontinuity in the subsequent data obtained. In the Figure to follow, some of these data points have been removed to improve clarity.

Where indicated below, overcharge abuse testing was carried out on electrically conditioned batteries, from the normal fully charged state, by charging at 3.6 A at ambient temperature until the electrical disconnect device activated. The time to disconnection and the maximum skin temperature of the battery was recorded (using a thermocouple strapped thereto).

BATTERY EXAMPLES

A series of 18650 batteries was assembled as described above wherein different additives were incorporated in the electrolyte. Table 1 below summarizes the types of additives used and the amount used in each case (expressed as a % of the weight of the electrolyte). Additives of the invention were all used at a 2.5% level. For purposes of comparison, batteries were also assembled without any additive and with varying amounts of the prior art additive biphenyl.

TABLE 1

| Example number | Type of additive | Amount of additive (% by weight) | Maximum skin temperature (° C.) | Disconnect time (hours) |
| --- | --- | --- | --- | --- |
| IE1 | 2,2-diphenylpropane | 2.5 | 52, 55 | 0.048, 0.050 |
| IE2 | diphenylmethane | 2.5 | NA, 69 | 0.064, 0.065 |
| IE3 | 1,2-diphenylethane | 2.5 | 57, 56 | 0.049, 0.046 |
| IE4 | 2-fluorobiphenyl | 2.5 | 49, 53 | 0.049, 0.050 |
| IE5 | 2,2'-difluorobiphenyl | 2.5 | 76, 102 | 0.079, 0.105 |
| IE6 | 3-thiopheneacetonitrile | 2.5 | 90, 101 | 0.080, 0.085 |
| CE1 | none | 0 | 103, 111 | 0.122, 0.115 |
| CE2 | biphenyl | 1.0 | 89, 91 | 0.083, 0.083 |
| CE3 | biphenyl | 2.5 | 45, 47 | 0.030, 0.031 |

Figure 2:
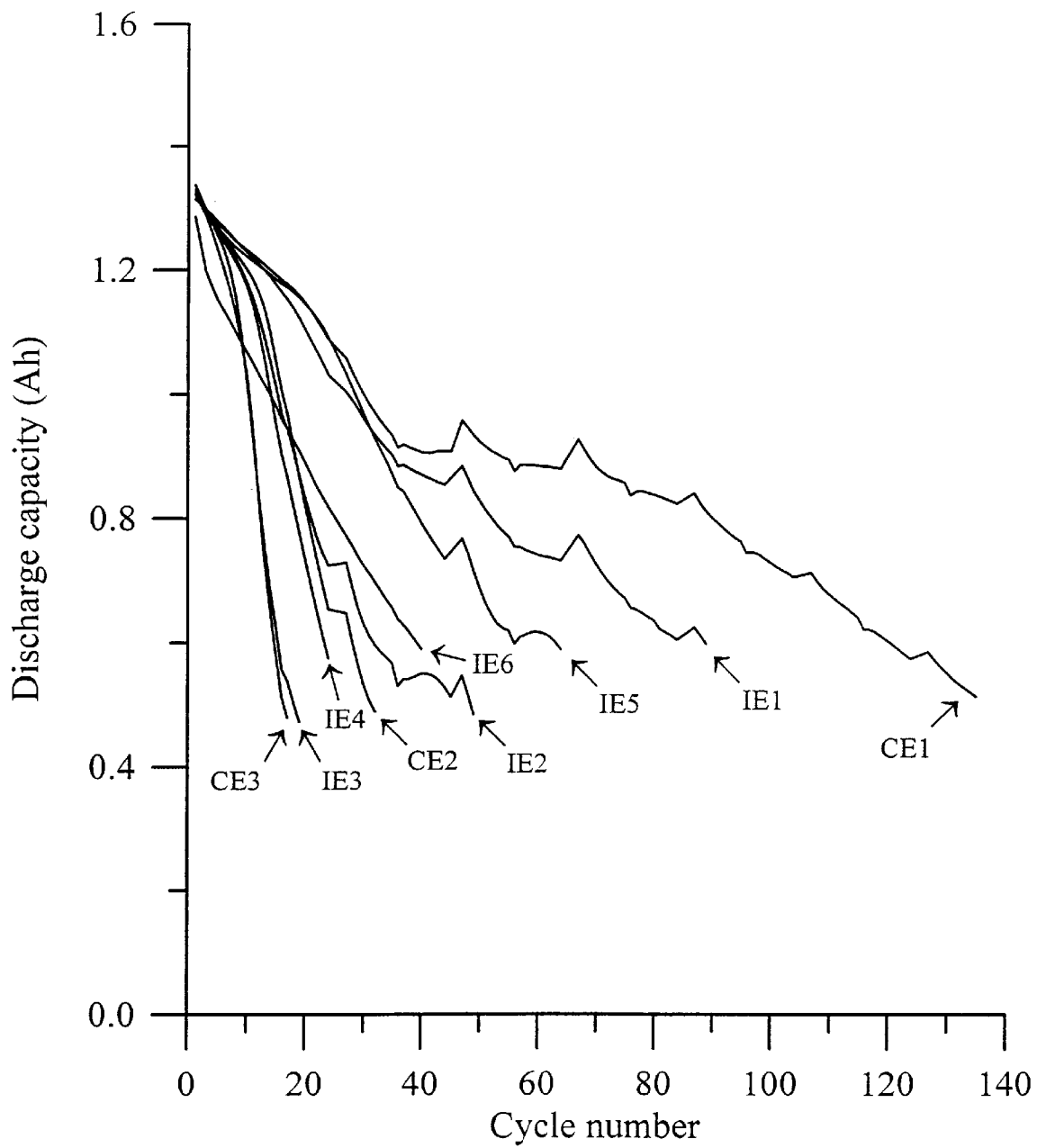
FIG. 2 shows the capacity versus cycle number data for representative batteries of the Examples.

Two batteries of each kind in the series were cycle tested as described above at 40° C. to an upper voltage limit of 4.3 V in order to confirm the reproducibility of the results. FIG. 2 shows the discharge capacity versus cycle number data for a representative battery of each kind in the series. As expected, the cycle life characteristics are progressively worse with increasing amounts of biphenyl additive present. The batteries of the invention which comprised 2.5% by weight additive exhibited cycle life results between that of batteries with no additives and that of batteries with a similar level (2.5% by weight) of biphenyl additive. Thus, for a given amount of additive by weight, the inventive additives in Table 1 (IE1 to IE6) show better cycling performance than biphenyl under these conditions. Inventive Example 1 (IE1), comprising a 2,2-diphenylpropane additive, shows the best cycling performance in the group and is almost the equal of Comparative Example 1 (CE1) comprising no additive. On the other hand, Inventive Example 3 (IE3) comprising a 1,2-diphenylethane additive shows a cycling performance which is only slightly better than that of Comparative Example 3 (CE3) comprising the same % of biphenyl additive. The cycling performance of the CE3 batteries is perhaps only marginally acceptable.

Two other batteries of each kind in the series were subjected to overcharge abuse testing as described above. The time taken to disconnect the internal disconnect device for each battery and the maximum temperature of each battery are shown in Table 1 above. (Note that the results for one of the IE2 series batteries was not available due to a malfunction of the thermocouple.) There is a strong correlation between the temperature and disconnect time indicating that the temperature rise is mainly dependent on the length of the overcharge and is not much affected by differences in any exothermic reactions which might arise due to the varied additives employed.

In the Comparative Examples (CE1 to CE3), the temperature and disconnect times increase as expected with decreasing amount of biphenyl additive. Although no Comparative battery vented violently with flame during this testing, the temperature and disconnect time for the CE1 batteries indicate that these batteries are dangerously close to thermal runaway. On the other hand, the Inventive Examples (IE1 to IE6) all show significantly shorter disconnect times due to the presence of the gassing agent additive, and hence show lower maximum temperatures during this overcharge abuse. Inventive Examples 1E2 to IE4 show results that are very close to those obtained with batteries comprising the same % of biphenyl (ie. CE3).

This example demonstrates that additives of the invention can provide better cycling performance than biphenyl at higher cycling temperature and charging voltages. Additionally, these additives produce sufficient gas during overcharge abuse to improve overcharge safety significantly when compared to batteries having no additives at all. Safety results are not generally as good as those obtained in batteries having a similar amount of biphenyl additive. However, given that a tradeoff may be required between cycling performance and safety, the additives of the invention can allow for adequate results in both cycling and safety and may therefore be preferred over additives like biphenyl. In the above Examples, the 2,2-diphenylpropane additive is preferred.

Those skilled in the art will be aware that the specific embodiments disclosed in the preceding are merely representative of the invention and that many other variations are possible within the scope of the invention. For example, the aforementioned additives may be expected to provide cycling benefits in high voltage (eg. circa 4.2 V) lithium metal or polymer electrolyte based batteries as well as in conventional lithium ion batteries. Accordingly, the scope of the invention should be construed by the following claims.

What is claimed is:

1. A non-aqueous rechargeable lithium battery having a lithium insertion compound cathode, a lithium or lithium compound anode, a non-aqueous electrolyte, a maximum operating charging voltage, and an additive mixed in said electrolyte, said additive polymerizing at battery voltages greater than the maximum operating charging voltage thereby protecting the battery during or after overcharge abuse, wherein the additive is selected from the group consisting of:

i) phenyl-R-phenyl compounds wherein R is an aliphatic hydrocarbon,
　ii) fluorine substituted biphenyl compounds, and
　iii) 3-thiopheneacetonitrile.

2. A non-aqueous rechargeable lithium battery as claimed in claim 1 wherein the additive is diphenylmethane, 1,2-diphenyletlhane, or 2,2-diphenylpropane.

3. A non-aqueous rechargeable lithium battery as claimed in claim 2 wherein the additive is 2,2-diphenylpropane.

4. A non-aqueous rechargeable lithium battery as claimed in claim 1 wherein the additive is 2-fluorobiphenyl or 2,2'-difluorobiphenyl.

5. A non-aqueous rechargeable lithium battery as claimed in claim 1 wherein the battery additionally comprises an internal electrical disconnect device, said disconnect device activating at a predetermined internal pressure; and said additive generates gas during the polymerizing and pressure activates the disconnect device during overcharge abuse.

6. A non-aqueous rechargeable lithium battery as claimed in claim 1 wherein the mixture of electrolyte and additive comprises about 2.5% or less additive by weight.

7. A non-aqueous rechargeable lithium battery as claimed in claim 1 wherein the maximum operating charging voltage is greater than 4 volts.

8. A non-aqueous rechargeable lithium battery as claimed in claim 1 wherein the maximum operating charging voltage is greater than 4.2 volts.

9. A non-aqueous rechargeable lithium battery as claimed in claim 1 wherein the operating temperature of the battery is greater than 40° C.

10. A non-aqueous rechargeable lithium battery as claimed in claim 1 wherein the lithium insertion compound cathode is selected from the group consisting of $Li_xMn_2O_4$, $Li_xCoO_2$, and $Li_xNiO_2$.

11. A non-aqueous rechargeable lithium battery as claimed in claim 10 wherein the lithium insertion compound cathode is $Li_xMn_2O_4$.

12. A non-aqueous rechargeable lithium battery as claimed in claim 1 wherein the anode is a carbonaceous compound.

13. A non-aqueous rechargeable lithium battery as claimed in claim 12 wherein the carbonaceous compound is graphitic.

14. A non-aqueous rechargeable lithium battery as claimed in claim 1 wherein the electrolyte solvent comprises an organic carbonate.

15. A non-aqueous rechargeable lithium battery as claimed in claim 14 wherein the electrolyte solvent comprises a mixture of organic carbonates selected from the group consisting of propylene carbonate, ethylene carbonate, and ethyl methyl carbonate.

16. A non-aqueous rechargeable lithium battery as claimed in claim 1 wherein the electrolyte solute comprises $LiPF_6$.

17. A non-aqueous rechargeable lithium battery as claimed in claim 1 additionally comprising a separator wherein the separator does not fuse shut below about 125° C.

18. A non-aqueous rechargeable lithium battery as claimed in claim 1 wherein the additive polymerizes, to form a polymer which increases the internal resistance of the battery thereby reducing charging current and protecting the battery during overcharge abuse.

19. A non-aqueous rechargeable lithium battery as claimed in claim 1 wherein the additive polymerizes to form an electrically conductive polymer which creates an internal short circuit in the battery during overcharge abuse and subsequently discharges the battery to a safe state of charge.

20. A method for providing overcharge protection in a non-aqueous rechargeable lithium battery, the battery having a lithium insertion compound cathode; a lithium or lithium compound anode; a non-aqueous electrolyte; a maximum operating charging voltage; and an additive mixed in said electrolyte; said additive irreversibly polymerizing at battery voltages greater than the maximum operating charging voltage such that the battery is protected during or after overcharge abuse, which comprises:

a) selecting an additive from the group consisting of phenyl-R-piheniyl compounds wherein R is an aliphatic hydrocarbon, fluorine substituted biphenyl compounds, and 3-thiopheneacetonitrile; and b) mixing an amount of the additive in said electrolyte wherein the amount is sufficient to protect the battery as the additive reacts during overcharge abuse.

21. A method as claimed in claim 20 wherein the additive is diphenylmethane, 1,2-diphenylethane, or 2,2-diphenylpropane.

22. A method as claimed in claim 20 wherein the additive is 2-fluorobiphenyl or 2,2'-difluorobiphenyl.

23. A method as claimed in claim 20 wherein the battery additionally comprises an internal electrical disconnect device, said disconnect device activating at a predetermined internal pressure, and the amount of additive generates sufficient gas during the reacting so as to pressure activate the disconnect device during overcharge abuse.

24. A method as claimed in claim 20 wherein the mixture of electrolyte and additive comprises about 2.5% or less additive by weight.

25. A method as claimed in claim 20 wherein the maximum operating charging voltage is greater than 4 volts.

26. A method as claimed in claim 20 wherein the maximum operating charging voltage is greater than 4.2 volts.

* * * * *